US008601060B2

(12) United States Patent
Barkley et al.

(10) Patent No.: US 8,601,060 B2
(45) Date of Patent: Dec. 3, 2013

(54) REAL-TIME BLOGGING SYSTEM AND PROCEDURES

(75) Inventors: Warren V. Barkley, Mill Creek, WA (US); Andrew P. Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1569 days.

(21) Appl. No.: 11/450,613

(22) Filed: Jun. 9, 2006

(65) Prior Publication Data

US 2007/0288601 A1     Dec. 13, 2007

(51) Int. Cl.
*G06F 15/16*     (2006.01)

(52) U.S. Cl.
USPC ........................................ 709/205

(58) Field of Classification Search
USPC ........................................ 709/205
See application file for complete search history.

(56) References Cited

U.S. PATENT DOCUMENTS

| 6,282,270 | B1 | 8/2001 | Porter |
| 6,859,451 | B1 | 2/2005 | Pasternack et al. |
| 6,965,890 | B1 | 11/2005 | Dey et al. |
| 2001/0013054 | A1* | 8/2001 | Okawa et al. ................. 709/204 |
| 2003/0229900 | A1* | 12/2003 | Reisman ........................ 725/87 |
| 2004/0078431 | A1 | 4/2004 | Ahn |
| 2004/0203608 | A1 | 10/2004 | Osann, Jr. |
| 2004/0267943 | A1 | 12/2004 | Ryu |
| 2005/0038717 | A1 | 2/2005 | McQueen, III et al. |
| 2005/0101300 | A1 | 5/2005 | Hon et al. |
| 2005/0166138 | A1 | 7/2005 | Kundu |
| 2005/0273503 | A1* | 12/2005 | Carr et al. ..................... 709/219 |
| 2006/0064502 | A1* | 3/2006 | Nagarajayya ................. 709/237 |
| 2006/0230061 | A1* | 10/2006 | Sample et al. ............ 707/103 R |
| 2007/0047479 | A1* | 3/2007 | Shaffer et al. ................. 370/328 |

FOREIGN PATENT DOCUMENTS

WO     WO-02073331 A2     9/2002
WO     WO-2005106729 A1     11/2005

OTHER PUBLICATIONS

Stone, Biz, "Blogging: Genius Strategies for Instant Web Content", Publisher: New Riders, Published Sep. 11, 2002.*
Meloni, "Blogging in a Snap", Nov. 22, 2005, Chapter 2 and pp. 103-104 of Chapter 6.*
Every, Shawn Van, "Interactive Tele-Journalism; A System for Low Cost, Live, Interactive News Television Production",http://www.walking-productions.com/itj/docs/itj_thesis.pdf.
Mankins, Matthew William David, "Location Linked Information", http://xenia.media.mit.edu/~mankins/lli/lli-thesis.pdf.

* cited by examiner

*Primary Examiner* — William Goodchild

(57) ABSTRACT

An instant message is received, converted to blog-compatible information, and posted on a blog.

14 Claims, 3 Drawing Sheets

REAL-TIME BLOGGING SYSTEM AND PROCEDURES

BACKGROUND

Instant messaging is a popular online mode of communication. Typically a number of individuals will authenticate to an instant messaging server, thus enabling more-or-less instantaneous communication with one another to form an instant messaging session.

Another popular online mode of communications is "blogs", or web-logs. Blogs are web pages updated often and often contemporaneously with the blogger's thoughts, experiences, news, commentary, and so on. Blogs often provide a capability for reader feedback via comments.

It would be advantageous to provide interaction and cross-functionality between instant messaging and blogs (or other types of information repositories).

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

An instant message may be received, converted to blog-compatible information, and posted on a blog. A multipoint conference server may provide instant messaging capabilities such that instant messaging activity of multiple participants may be output as blog posts that mirror the instant messaging activity. The blog server may act as a passive participant of the instant message session.

The blog posts may associate a participant's blog identity with instant message information from the participant. A participant's instant message identity may be converted to a blog identity for the participant and associated with instant message information that is posted on the blog.

Comments to a blog post may be communicated as one or more instant messages back to at least the participant responsible for the blog post.

This may involve posting a response to a blog post, converting the blog post response to an instant message and providing the instant message to an instant message participant responsible for the blog post.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Instant Messaging System

Figure 1:
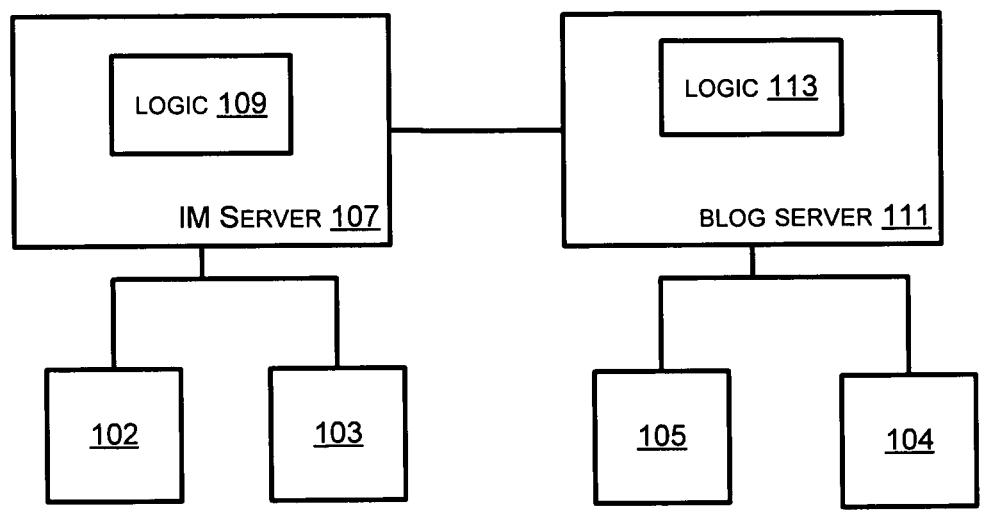
FIG. 1 is a block diagram of an embodiment of an instant messaging and blogging system.

FIG. 1 is a block diagram of an embodiment of an instant messaging and blogging system. An instant messaging server 107 comprises logic 109 to act in accordance with procedures described herein. Instant messages pass from and to instant message clients 102, 103, and/or 111 through the instant messaging server 107. The instant messages may be text, audio, video, other media types, or combinations thereof. Instant messaging clients are devices to which the instant messaging server 107 provides instant messaging services. Examples of instant messaging clients include personal computers, mobile phones, and personal digital assistants. A blog server 111 provides access and/or interaction with one or more blogs by blog clients and blog owners. Blog servers are typically Internet-connected computing devices that provide access to blogs by blog clients, and update and maintenance of blogs by blog owners. Examples of blog clients include personal computers, mobile phones, personal digital assistants, and/or any device that may access and display web pages. Examples of blog servers are web page servers comprising well-known blog-enabling logic, such as MSN® Spaces (also known as Windows Live™ Spaces). In some embodiments, the blog server 111 may also operate as an instant messaging client 111.

The instant messaging server 107 and the blog server 111 may be implemented as separate products and hosted by separate equipment. That equipment may be co-located or physically separated with communication occurring over some facility such as a wireline an/or wireless network or networks. In some cases, the instant messaging server and blog server may be implemented within one device and/or product. Alternatively, the blog server and/or instant messaging server and/or parts thereof may be implemented on distinct co-located or physically remote devices.

When a client (for example, client 102) of the instant messaging server 107 is sending messages to and/or receiving messages from another client (for example, client 103) the two clients 102, 103 are said to be in session. More than two clients may be in session at once.

Sometimes, a particular instant messaging client may choose to or be set up to only receive messages. Such a client may be considered to be a monitor or passive participant of the instant messaging session or sessions in which it participates. In some embodiments, the blog server 111, acting as an instant messaging client, may be in a mode where it functions as a monitor/passive participant. That is to say, the blog server 111 may receive instant messages from one or more instant messaging sessions, but may not generate messages in return.

The blog server 111 may comprise logic 113 which enables it to act in accordance with procedures described herein. The logic 113 may for example enable the blog server 111 to perform services necessary to maintain blogs, and to receive and/or send instant messages. The blog server 111 provides blog features to clients 104 and 105.

When the blog server 111 receives an instant message from the instant messaging server 107, it may post that instant message to one or more blogs. The blog clients 104 and 105 may see the instant message information as one or more blog postings and/or comments to blog postings. When posting the message to a blog, the blog server 111 may perform format conversions (for example, from instant message plain text to Hypertext Markup Language) and may choose to hide, transform, or presence-enable the identity of the original instant message sender. For example, the blog server 111 may map the instant message identity of the party responsible for providing the instant message to a blog identify for that same party. The blog server 111 may place an icon or other indication near the blog post (such as a yellow smiley face) to indicate that the sender is present, i.e. available now for messaging.

Herein, the term "blog-post format" and "blog-compatible format" are understood to encompass any format that captures the information in a persistent fashion for later viewing, such as persistent chat format. In other words, the terms blog-post format or blog-compatible format need not refer to Hypertext Markup Language or other World Wide Web standard format. In general, format conversion takes place to convert to and from instant message formats to the format employed by the persistent viewing technology.

An individual operating via a blog client 104 105 may respond to or comment upon blog posts. The blog server 111 may convert blog posts/comments to instant message(s) and communicate the instant messages to the instant messaging server 107. The instant message(s) may be sent to the party(s) responsible for the blog post responded to and/or commented upon. Or, the instant message(s) may be sent to the currently present instant message session participants who originated or received the instant message that resulted in the blog post commented upon/responded to. The choice of who to communicate the blog post to may be configured as options of the blog server (for example by the blog owner(s) and/or administrator of the blog server), and/or by configuration options of the instant message server. When communicating a blog post to the instant messaging server 107 as an instant message, the blog server 111 may perform format conversions and hide, transform, or presence-enable the identity of the original instant message participant. For example, blog posts in HTML format may be converted to text, or to Short Message System (SMS) format if the instant message client is a cell phone. In some embodiments, the instant messaging server 107 may indicate that the blog server 111 is the sender of the instant message(s).

The processing just described elucidates a situation where a blog client is responding to a blog post which was originated as an instant message. However, blogging and instant messages may be integrated in other scenarios. For example, any blog post response where the person who originated the original post is currently present in an instant messaging session may in some embodiments result in the blog post response being sent as an instant message.

In some embodiments, the instant messaging server 107 may comprise logic 109 to recognizes that a particular client 111 is a blog server, for example via a configuration option that identifies a particular client as a blog server. The instant messaging server 107 may comprise logic to inform session participants of the availability of blogs. For example, an instant messaging client 102 103 may be notified that a blog server is present and/or may be presented with an indication of which blogs are available for message posting.

In some embodiments, the instant messaging server 107 may be the agent performing the primary transformation of content between instant message format and blog format. In other embodiments, the blog server 111 may act as the primary agent in this regard.

In some embodiments, the instant messaging server 107 may log on to the blog server 111 as a blog client to present, for one or more instant messaging sessions, the instant messages it is passing as blog posts to the blog server 111.

Process of Interacting Between an Instant Messaging System and a Blog

Figure 2:
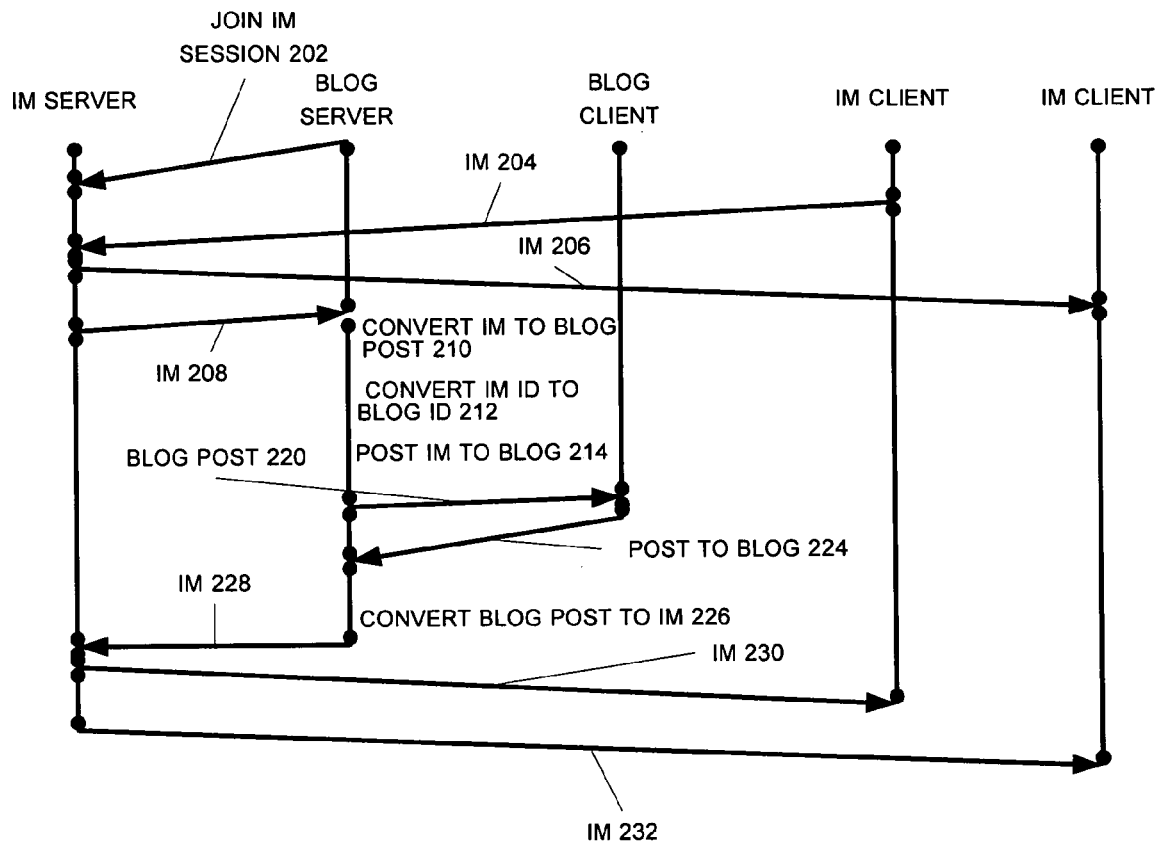
FIG. 2 is an action flow diagram of an embodiment of a process of interacting between an instant messaging system and a blog.

FIG. 2 is an action flow diagram of an embodiment of a process of interacting between an instant messaging system and a blog. The figure represents an embodiment in which the blog server comprises logic to enable it to receive and send instant messages as an instant messaging participant.

At 202, the blog server joins an instant messaging session having two other participants. Of course, there could be more or fewer participants in any given instant messaging session.

At 204, an instant message is sent to an instant messaging server. At 206, the instant messaging server sends that message to a first instant messaging client. At 208, the instant messaging server sends that message to a second instant messaging client, which happens to be the blog server.

At 210, the blog server converts that instant message to a blog post format. At 212, the blog server converts the instant message sender identification to blog poster identification. At 214, the blog server posts the converted content from the instant message as a blog post, possibly also including the blog poster identification. At 220, the blog post is read by a blog client.

Posting the instant message to the blog may involve making the blog information available on a web page or other media, or via one or more links or references or pointers from a web page or other media, or may involve rendering the information (e.g. playing audio and/or video) to viewers of the web page or other media.

In some embodiments, multiple instant messages may be batched by the instant message server, blog server, or both cooperatively, and posted to the blog as a batch. Batch posting may be triggered by various events/circumstances. For example, a batch post may be done when an IM thread owner or blog owner makes a response in an IM thread, or when an IM session ends.

At 224, the blog client posts a response to the blog post (which was originally the instant message), e.g. a blog post comment. At 226, the blog server converts the blog post comment to an instant message. At 228, the blog server sends the instant message representing the blog post comment to the instant messaging server. At 230 and 232, the instant messaging server sends the instant message (which was originally the blog post comment) to the two clients of the instant messaging session.

In general, an instant message is received, converted to blog-compatible information, and posted on a blog. Sometimes, blog posts and/or comments thereto may be converted to instant message-compatible information and sent out as instant messages.

These actions may be enabled by logic which has been implemented entirely in a blog server. Alternatively, these actions may be enabled by logic which has been implemented entirely in an instant messaging server. Or, both a blog server and an instant messaging server may comprise logic to enable the integration of instant messaging and blog posting as described herein.

In some embodiments, the logic to enable the integration of instant messaging and blog posting may be incorporated in whole or in part within one or more devices logically located between the instant messaging server and the blog server.

The instant messaging server may be a multipoint conference server (MCU). An MCU provides networked conferencing capabilities between multiple participants. Typically, such conferencing capabilities include video and audio conferencing capabilities, and also the ability to exchange non-audio/video information such as files, annotations, text, and so on. An MCU may thus be well-suited to hosting instant messaging sessions, especially those involving video and audio.

An MCU may provide instant messaging capabilities to multiple instant message session participants, and a participant of the multipoint conferencing server may receive instant messaging activity of the multiple instant message session participants and output blog posts that mirror the instant messaging activity.

The participant of the multipoint conferencing server that monitors the instant messaging activity of the multiple instant message session participants and outputs blog posts may be a blog server acting as a passive participant of the instant message session. As a passive participant, the blog server may be considered to be acting as a monitor of the instant message session. The blog server may comprise the ability to convert the instant messages to blog postings.

Id Association

The blog posts may associate a participant's blog identity with instant message information from an instant messaging session participant. This may involve converting a participant's instant message identity to a blog identity for the participant and associating the participant's blog identity with instant message information from the participant that is posted on the blog. The participant's identity may be presence-enabled on the blog posts. In other words, because the participant is present in an instant messaging session, that participant may be indicated on the blog to be presently available to receive feedback in the form of comments and/or responses to the blog posts for which the participant is responsible.

Process of Responding to Blog Posts and/or Comments

Figure 3:
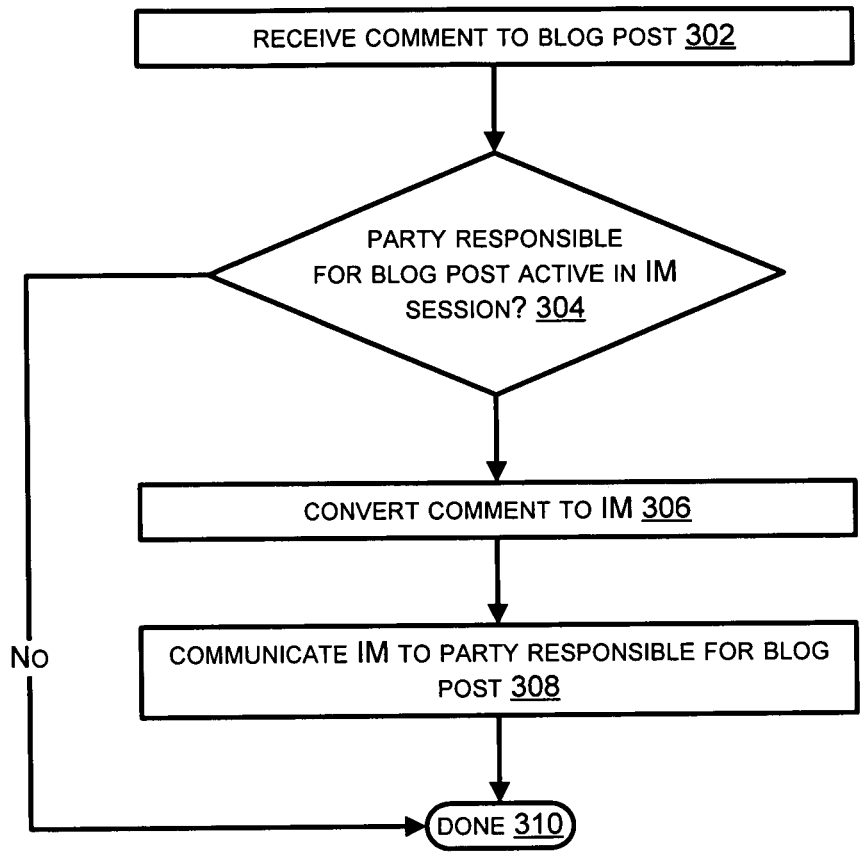
FIG. 3 is a flow chart of an embodiment of a process of responding to blog posts and comments.

FIG. 3 is a flow chart of an embodiment of a process of responding to blog posts and comments. At 302, a blog client posts a response to a blog post (referred to hereafter as the original post. This original post may, in some cases, have been created from an instant message.). At 304, it is determined if the party responsible for the original post is currently active in an instant messaging session.

If the party responsible for the original post is currently active in an instant messaging session, the blog post response is converted to an instant message at 306. At 308, the instant message incorporating the blog post response is sent to the party responsible for the original blog post. At 310, processing is complete.

Responding to Posts and/or Comments

Blog posts made "normally", e.g. using the blog server's conventional blog posting facilities, may be communicated as instant messages back to one or more of the instant message session participants. Alternatively, or in addition, comments by blog readers to a blog post may be communicated as one or more instant messages back to at least the participant responsible for the blog post. This may involve determining the instant message identity of the responsible party, and communicating a comment to the blog post to the responsible party as an instant message. In some implementations, the blog post/comment to the blog post may be communicated as an instant message only when the party responsible for the blog post is present in the instant messaging session.

In some embodiments, an instant message formed in response to a blog post response may be provided not only to the participant responsible for the blog post, but also to others who may have participated in a blog message thread comprising the response.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

What is claimed is:

1. A method comprising:
   a blog server receiving an instant message from a participant;
   the blog server converting the participant's instant message identity that originated the instant message to a blog identity for the participant;
   the blog server converting the instant message to blog-compatible information, wherein the blog-compatible information includes the converted blog identity;
   the blog server posting the blog-compatible information on a blog; and
   the blog server associating, on the blog post, the participant's blog identity with instant message information from the participant, wherein an indicator is placed with the blog post to indicate whether the participant is available for instant messaging.

2. The method of claim 1, further comprising:
   the blog server acting as a participant of a multipoint conferencing server and receiving instant messaging activity of multiple instant message session participants and outputting blog posts that mirror the instant messaging activity.

3. The method of claim 2, further comprising:
   the blog server acting as a passive participant of an instant message session involving the multiple instant message session participants.

4. The method of claim 1, further comprising:
   communicating comments to a blog post as one or more instant messages back to at least the participant responsible for the blog post.

5. The method of claim 4, wherein communicating comments to a blog post as one or more instant messages back to at least the participant responsible for the blog post further comprises:
   determining the instant message identity of a party responsible for a blog post, and communicating a comment to the blog post to the responsible party as an instant message.

6. The method of claim 5, wherein communicating a comment to the blog post to the responsible party as an instant message further comprises:
   communicating the comment to the blog post as an instant message if the party responsible for the blog post is present in the instant messaging session.

7. The method of claim 1, further comprising:
   communicating blog posts as instant messages back to one or more of the instant message session participants.

8. A method comprising:
   posting a response to a blog post;
   associating, on the blog post, a participant's blog identity responsible for the response with instant message information from the participant;
   converting the response to the blog post to an instant message and providing the instant message to at least an instant message participant responsible for the blog post; and
   indicating by placing an indicator with the blog post whether the participant responsible for the blog post is present in an instant messaging session.

9. The method of claim 8, wherein the posting a response to a blog post further comprises:
   posting a comment to the blog post.

10. The method of claim 8, wherein providing the instant message to at least an instant message participant responsible for the blog post further comprises:
    providing the instant message to the instant message participant responsible for the blog post and to any other instant message participants comprised by a thread to which the response is posted.

11. An article comprising a storage medium containing instructions that, when applied to affect the operation of an instant messaging system, results in:
    receiving an instant message from a participant;
    mapping from the participant's instant message identity that originated the instant message to a blog identity for the participant; and
    converting the received instant message to a blog-post, wherein the blog-post includes the mapped blog identity, wherein an indicator is placed with the blog post to indicate whether the participant is available for messaging.

12. The article of claim 11, further comprising instructions that, when applied, further results in:
    the instant messaging system receiving instant messaging activity of multiple instant message session participants and outputting blog posts that mirror the instant messaging activity.

13. The article of claim 11, wherein the instant messaging system comprises a multipoint conferencing server.

14. The article of claim 11, further comprising instructions that, when applied, further results in:
    converting a participant's instant message identity to a blog identity for the participant and associating, on the blog post, the participant's blog identity with instant message information from the participant that is posted on the blog.

* * * * *